United States Patent
Lim

(10) Patent No.: US 10,613,196 B2
(45) Date of Patent: Apr. 7, 2020

(54) APPARATUS FOR PROCESSING SIGNALS OF RADAR AND METHOD FOR PROCESSING SIGNALS THEREOF

(71) Applicant: MANDO CORPORATION, Gyeonggi-do (KR)

(72) Inventor: HaeSueng Lim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 774 days.

(21) Appl. No.: 15/177,330

(22) Filed: Jun. 8, 2016

(65) Prior Publication Data
US 2016/0363651 A1  Dec. 15, 2016

(30) Foreign Application Priority Data
Jun. 9, 2015  (KR) .......................... 10-2015-0081233

(51) Int. Cl.
*G01S 7/34* (2006.01)
*G01S 7/292* (2006.01)
(Continued)

(52) U.S. Cl.
CPC .............. *G01S 7/34* (2013.01); *G01S 7/2925* (2013.01); *G01S 7/2926* (2013.01); *G01S 7/414* (2013.01);
(Continued)

(58) Field of Classification Search
USPC .......................................................... 342/92
See application file for complete search history.

(56) References Cited

U.S. PATENT DOCUMENTS 4,077,038 A * 2/1978 Heller .................... G01S 7/2922
                                                       342/92
5,249,157 A * 9/1993 Taylor .................... G01S 7/4811
                                                       340/435
(Continued)

FOREIGN PATENT DOCUMENTS

KR       10-0750967       8/2007

*Primary Examiner* — Marc Anthony Armand
(74) *Attorney, Agent, or Firm* — Ladas & Parry, LLP

(57) ABSTRACT

The present embodiments relate to a radar signal processing apparatus and a signal processing method thereof in which an additional beamforming is performed by reflecting an angle of a target that is positioned in front of the vehicle or by reflecting a surrounding clutter situation thereof in order to thereby improve the performance of detecting the target in front of the vehicle. According to an embodiment, a radar signal processing apparatus may include: a transmitting unit configured to transmit radar signals forward from the vehicle; a receiving unit configured to receive reflected signals among the radar signals transmitted by the transmitting unit; and a signal processing unit configured to extract a target in front of the vehicle based on the signals received by the receiving unit, wherein the receiving unit receives the radar signals by using an antenna array including a plurality of receiving antennas, the signal processing unit integrates the signals received by the plurality of receiving antennas to perform the beamforming for obtaining a desired gain, and, if there is no target in the formed beams, determines the angle of the target in front of the vehicle in order to thereby perform the additional beamforming to match the determined target angle.

13 Claims, 10 Drawing Sheets

(51) Int. Cl.
*G01S 13/93* (2020.01)
*G01S 13/42* (2006.01)
*G01S 7/41* (2006.01)
*G01S 13/06* (2006.01)
*G01S 13/02* (2006.01)
*G01S 13/931* (2020.01)

(52) U.S. Cl.
CPC ............ *G01S 13/06* (2013.01); *G01S 13/426* (2013.01); *G01S 13/931* (2013.01); *G01S 2013/0245* (2013.01); *G01S 2013/9375* (2013.01)

(56) References Cited

U.S. PATENT DOCUMENTS

| | | | | |
|---|---|---|---|---|
| 5,280,457 A * | 1/1994 | Figueroa | ............... | G01S 5/22 367/127 |
| 7,623,062 B2 * | 11/2009 | Ding | ............... | G01S 13/42 342/147 |
| 8,314,732 B2 * | 11/2012 | Oswald | ............... | G01S 7/2926 342/114 |
| 2003/0142007 A1 * | 7/2003 | Ono | ............... | G01S 13/345 342/70 |
| 2005/0024257 A1 * | 2/2005 | Britton | ............... | G01S 7/412 342/70 |
| 2006/0284757 A1 * | 12/2006 | Zemany | ............... | G01S 13/32 342/22 |
| 2009/0102717 A1 * | 4/2009 | Lok | ............... | G01S 7/2813 342/379 |
| 2011/0187584 A1 * | 8/2011 | Pun | ............... | G01S 13/00 342/159 |
| 2012/0235857 A1 * | 9/2012 | Kim | ............... | G01S 13/345 342/134 |

* cited by examiner

APPARATUS FOR PROCESSING SIGNALS OF RADAR AND METHOD FOR PROCESSING SIGNALS THEREOF

CROSS REFERENCE TO RELATED APPLICATION

This application claims priority from Korean Patent Application No. 10-2015-0081233, filed on Jun. 9, 2015, which is hereby incorporated by reference for all purposes as if fully set forth herein.

BACKGROUND OF THE INVENTION

1. Field of the Invention

The present embodiment relates to a radar signal processing apparatus and a signal processing method thereof, and more particularly, to a radar signal processing apparatus and a signal processing method thereof in which beamforming is performed, and if there is no target in the formed beams, additional beamforming is performed by reflecting the angle of a target that is positioned in front of a vehicle or by reflecting a surrounding clutter situation thereof, thereby improving the performance of detecting the target in front of the vehicle.

2. Description of the Prior Art

The phased-array antenna type of radar sensor detects targets by using the intensities of signals, which are received by a plurality of antennas arranged in a predetermined direction, and the phase difference thereof. At this time, in order to improve the signal-to-noise ratio (SNR) of a signal that is received by a plurality of receiving antennas, integration for the digital beamforming is performed, and the beam spread angle may be determined through an additional constant phase shift.

Radar systems for vehicles using a digital beamforming technique have been disclosed in several documents including Korean Patent No. 0,750,967.

The determination of the beam spread angle in the phased-array antenna type of radar sensor including the patent above significantly affects the determination of the radar detection performance in relation to the intensities of a signal and a clutter signal. If the position of the target matches the beam spread angle, the intensity of the target signal becomes high enough. Otherwise, the intensity of the received target signal is relatively lowered so that the target detection performance may be degraded.

In order to improve the target detection performance, the digital beamforming should be performed with respect to various angles at which the signal-to-clutter ratio is maximized. However, this is limited to the amount of calculation.

Therefore, an enhanced radar signal processing apparatus is required, which performs the digital beamforming to match the target that is positioned within a vulnerable angle in addition to the constant phase shift in order to thereby improve the target detection performance.

REFERENCES

Korean Patent No. 0,750,967 (registered on 14 Aug. 2007) "High resolution short range radar system using virtual array antenna system"

SUMMARY OF THE INVENTION

The object of the present embodiment is to provide a radar signal processing apparatus and a signal processing method thereof, in which the beamforming is performed, and if there is no target in the formed beams, the target angle is determined and the additional beamforming is performed to match the determined target angle in order to thereby improve the performance of detecting the target that is positioned within a vulnerable area.

Another object of the present embodiment is to provide a radar signal processing apparatus and a signal processing method thereof, in which the beamforming is performed, and if there is no target in the formed beams while the clutter exists near the vehicle, the additional beamforming is performed by obtaining the gains of the target and the clutter and by adjusting the beam spread angle such that the SCR of the obtained gains is maximized so that the signal intensities of the target and the clutter are clearly distinguished to enable the extraction of the distance, speed, and azimuth of the target.

According to an embodiment of the present invention, a radar signal processing apparatus may include: a transmitting unit configured to transmit radar signals forward from the vehicle; a receiving unit configured to receive signals that are reflected back among the radar signals transmitted by the transmitting unit; and a signal processing unit configured to extract a target in front of the vehicle based on the signals received by the receiving unit, wherein: the receiving unit receives the received signals that are reflected back among the radar signals by using an antenna array including a plurality of receiving antennas; the signal processing unit integrates the signals received by the plurality of receiving antennas and performs two or more beamformings, which have different beam spread angles, for obtaining a desired gain; and the beamforming is performed such that one or more beam spread angles are determined based on target angle information between the travelling direction of the vehicle and the target.

The signal processing unit may determine the target angle information based on track information of the preceding target.

The one or more beam spread angles may be determined such that the gain of the received signal is maximized in the target angle.

If there is a clutter structure that generates a clutter signal, the signal processing unit may determine the one or more beam spread angles by further using clutter angle information between the travelling direction of the vehicle and the clutter structure.

The signal processing unit may determine the one or more beam spread angles such that the difference between the target gain by the target and the clutter gain by the clutter structure is maximized.

The signal processing unit may determine the one or more beam spread angles such that the ratio of the target gain by the target to the clutter gain by the clutter structure is minimized.

The signal processing unit may determine the one or more beam spread angles such that the ratio of the clutter gain by the clutter structure to the target gain by the target is maximized.

The signal processing unit may determine the one or more beam spread angles and may perform the beamforming when the vehicle travels on a curved road.

According to another embodiment, a radar signal processing apparatus may include: a transmitting unit configured to transmit radar signals forward from the vehicle; a receiving unit configured to receive signals that are reflected back among the radar signals transmitted by the transmitting unit; and a signal processing unit configured to extract a target in front of the vehicle based on the signals received by the receiving unit, wherein the receiving unit receives the radar signals by using an antenna array including a plurality of receiving antennas, the signal processing unit integrates the signals received by the plurality of receiving antennas, performs the beamforming for obtaining a desired gain, and if there is no target in the formed beams while the clutter exists near the vehicle, obtains the gains of the target and the clutter, respectively, and adjusts the beam spread angle such that the ratio of the obtained gains reaches a predetermined maximum reference ratio in order to thereby perform the additional beamforming.

In addition, according to another embodiment, a signal processing method of a radar signal processing apparatus that includes a transmitting unit configured to transmit radar signals forward from the vehicle, a receiving unit configured to receive signals reflected back among the radar signals transmitted by the transmitting unit, and a signal processing unit configured to extract a target in front of the vehicle based on the signals received by the receiving unit may include: letting the signal processing unit integrate the signals received by a plurality of receiving antennas contained in the receiving unit to perform the beamforming for obtaining a desired gain; letting the signal processing unit determine the angle of a target positioned in front of the vehicle if there is no target in the formed beams; and letting the signal processing unit perform the additional beamforming to match the determined target angle.

In the determining operation, the target angle may be determined based on track information of the preceding target.

In the determining operation, the target angle may be determined to match the travelling direction of the vehicle.

In addition, according to another embodiment, a signal processing method of a radar signal processing apparatus that includes a transmitting unit configured to transmit radar signals forward from the vehicle, a receiving unit configured to receive signals reflected back among the radar signals transmitted by the transmitting unit, and a signal processing unit configured to extract a target in front of the vehicle based on the signals received by the receiving unit may include: letting the signal processing unit integrate the signals received by a plurality of receiving antennas contained in the receiving unit to perform the beamforming for obtaining a desired gain; letting the signal processing unit obtain the gains of the target and the clutter, respectively, if there is no target in the formed beams while the clutter exists near the vehicle; and letting the signal processing unit adjust the beam spread angle such that the ratio of the obtained gains reaches a predetermined maximum reference ratio in order to thereby perform the additional beamforming.

In addition, according to another embodiment, a signal processing method of a radar signal processing apparatus that includes a transmitting unit configured to transmit radar signals forward from the vehicle, a receiving unit configured to receive signals reflected back among the radar signals transmitted by the transmitting unit, and a signal processing unit configured to extract a target in front of the vehicle based on the signals received by the receiving unit may include: letting the signal processing unit determine one or more beam spread angles based on target angle information between the travelling direction of the vehicle and the target; and letting the signal processing unit integrate the signals received by the plurality of receiving antennas contained in the receiving unit based on one or more beam spread angles and a predetermined beam spread angle, respectively, in order to thereby perform two or more beamformings in order to secure a desired gain.

The one or more beam spread angles may be determined such that the gain of the received signal is maximized in the target angle.

If there is a clutter structure that generates a clutter signal, the one or more beam spread angles may be determined by further using clutter angle information between the travelling direction of the vehicle and the clutter structure.

The one or more beam spread angles may be determined such that the difference between the target gain by the target and the clutter gain by the clutter structure is maximized.

According to the embodiments of the present invention, the beamforming is performed, and if there is no target in the formed beams, the target angle is determined and the additional beamforming is performed to match the determined target angle in order to thereby improve the performance of detecting the target that is positioned within a vulnerable area.

In addition, according to the embodiments of the present invention, the beamforming is performed, and if there is no target in the formed beams while the clutter exists near the vehicle, the additional beamforming is performed by obtaining the gains of the target and the clutter and by adjusting the beam spread angle such that the SCR of the obtained gains is maximized so that the signal intensities of the target and the clutter are clearly distinguished in order to thereby extract the distance, speed, and azimuth of the target.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, the present embodiments will be described in detail with reference to the accompanying drawings.

Figure 1:
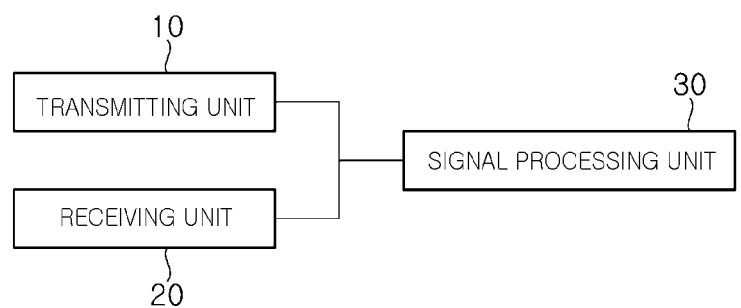
FIG. 1 is a block diagram to explain a radar signal processing apparatus, according to the present embodiment.
Figure 2:
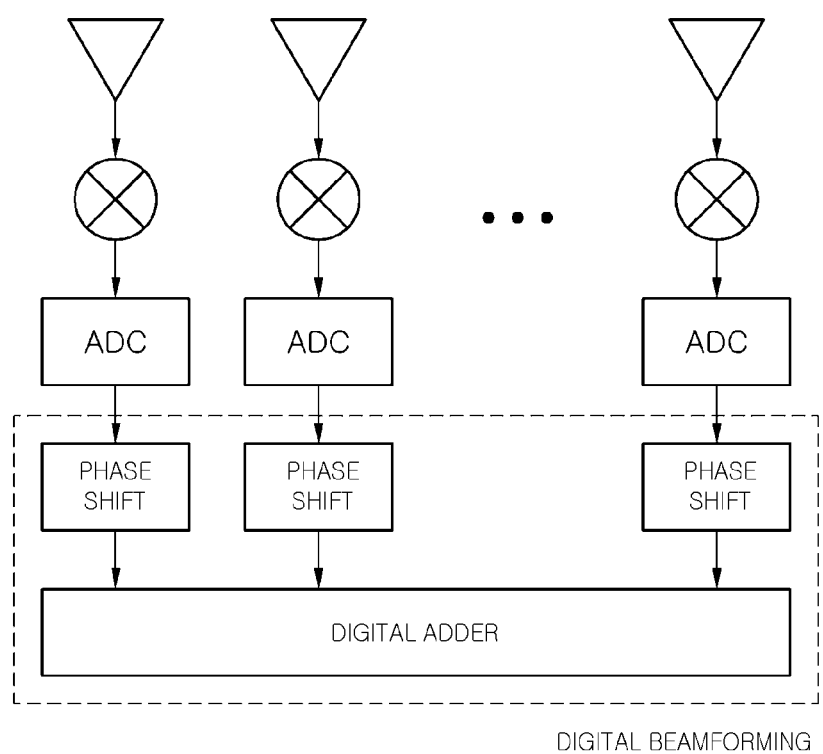
FIG. 2 is a view to explain a process of performing the beamforming.
Figure 3:
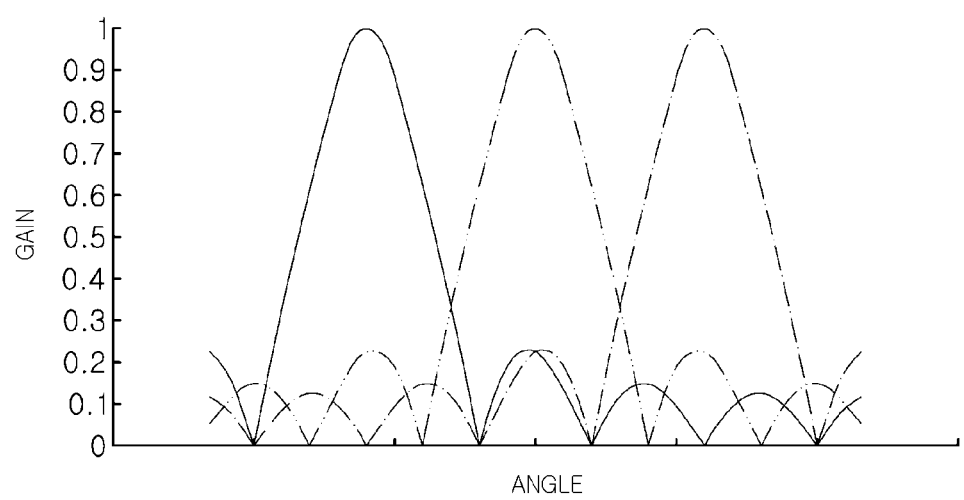
FIG. 3 is a view showing the basic beam.

FIG. 1 is a block diagram to explain a radar signal processing apparatus, according to the present embodiment, and FIG. 2 is a view to explain a process of performing the beamforming. FIG. 3 is a view showing the basic beam.

Referring to FIG. 1, the radar signal processing apparatus, according to the present embodiment, includes: a transmitting unit 10 that transmits radar signals forward from the vehicle; a receiving unit 20 that receives signals that are reflected back among the transmitted radar signals; and a signal processing unit 30 that integrates the received signals and performs the beamforming for obtaining a desired gain in order to thereby extract the distance, speed, and azimuth with respect to a target.

The receiving unit 20 receives signals that are reflected back among the radar signals transmitted by the transmitting unit 10 by using an antenna array including a plurality of receiving antennas.

Referring to FIG. 2, the signal processing unit 30 may: convert the signal received from a plurality of receiving antennas into a digital signal by means of an ADC (analog-digital converter); shift the phase of the received signal, which has been converted to the digital signal; and perform the digital beamforming in order to secure the gain that is obtained by summating the shifted phases.

Two or more beamformings may be performed, and one or more beamformings may be determined by configuring the target angle between the target and the travelling direction of the vehicle as the beam spread angle. Hereinafter, a description will be made of the beamforming that is performed by configuring the target angle between the target and the travelling direction of the vehicle as the beam spread angle.

The signal processing unit 30 determines whether or not there is a target in the formed beams (that is, the basic beam). If there is no target in the basic beam, the signal processing unit 30 determines the angle of a target that is positioned in front of the vehicle, and performs the additional beamforming to match the determined target angle. Alternatively, the signal processing unit 30 may perform the additional beamforming in which the target angle is configured as the beam spread angle regardless of the existence of the target in the basic beam.

Here, the target angle and the existence of the target may be estimated through track information (distance, speed, and angle information) of the vehicle, which results from the signal processing during the previous calculation cycle, because the detection by radar sensors including the transmitting unit 10 and the receiving unit 20 is made in real time. The track is a final result of the signal processing for estimating the actual position of the target by using the target information that is measured while containing an error in the signal processing. Even if no target is detected due to the received signal being in a bad condition, the actual target position may be estimated in the tracking by using the track information of the previous cycle. The existence of the target means the existence of a preceding vehicle.

The basic beam is illustrated in FIG. 3, and the basic beam may be comprised of three beams that are adjusted by a predetermined angle, respectively.

The signal processing unit 30 may extract and determine the target angle that is contained in the tracking information of the preceding target, or may determine the target angle according to the travelling direction of a vehicle.

In addition, the signal processing unit 30 detects the preceding target through the additional beamforming to match the determined target angle in order to thereby extract the distance, speed, and azimuth of the target. That is, a peak frequency, which is determined to be a target, is measured in a certain beam, and the signal processing unit 30 may extract the distance information (the distance, speed, and azimuth of the target) of the target by using signal information of the corresponding frequency. In addition, the signal processing unit 30 may perform the additional beamforming by configuring one or more beam spread angles such that the received signal gain is maximized in the target angle.

The extracted distance, speed, and azimuth of the target may be applied to the convenient devices for the driver (for example, an adaptive cruise control device) to enable autonomous travelling while stably maintaining the distance to the preceding vehicle.

In addition, if a clutter (for example, a guard rail) exists near the vehicle, the signal processing unit 30 calculates the gains of the target and the clutter, respectively, and performs the additional beamforming by adjusting the beam spread angle such that the calculated SCR (signal-to-clutter ratio) reaches a configured maximum reference ratio. That is, since the signal processing unit 30 adjusts the beam spread angle for an optimal SCR and then performs the additional beamforming, the target signal and the clutter signal can be separated so that the target can be easily extracted even if the clutter exists near the vehicle. The beam spread angle in the present specification denotes a reference angle for the beamforming, and may be referred to as various terms, such as a directional angle or a beam central angle, but the beam spread angle is not limited to a specific name.

For example, if there is a clutter structure that generates a clutter signal, the signal processing unit 30 may determine one or more beam spread angles for the additional beamforming by further using clutter angle information between the travelling direction and the clutter structure. For example, one or more beam spread angles for the additional beamforming may be determined such that the difference between the target gain by the target and the clutter gain by the clutter structure is maximized. As another example, one or more beam spread angles for the additional beamforming may be determined such that the ratio of the target gain by the target to the clutter gain by the clutter structure is minimized. As another example, one or more beam spread angles for the additional beamforming may be determined such that the ratio of the clutter gain by the clutter structure to the target gain by the target is maximized. In the following description, the clutter structure will be referred to as a clutter.

Since the radar sensors including the transmitting unit 10 and the receiving unit 20 provide speed information, the signal processing unit 30 may determine the stationary target having an absolute speed of '0' to be a clutter. Like the targets, since the clutters have angle information, if the stationary targets having an absolute speed of '0' are consecutively arranged or form a specific group, the signal processing unit 30 may determine that the clutter is positioned at the corresponding angle through a variety of decision logic. Although the clutter is determined based on the speed information contained in the radar in the present embodiment, the existence of the clutter may be determined through surrounding images that are obtained from a camera.

Figure 4:
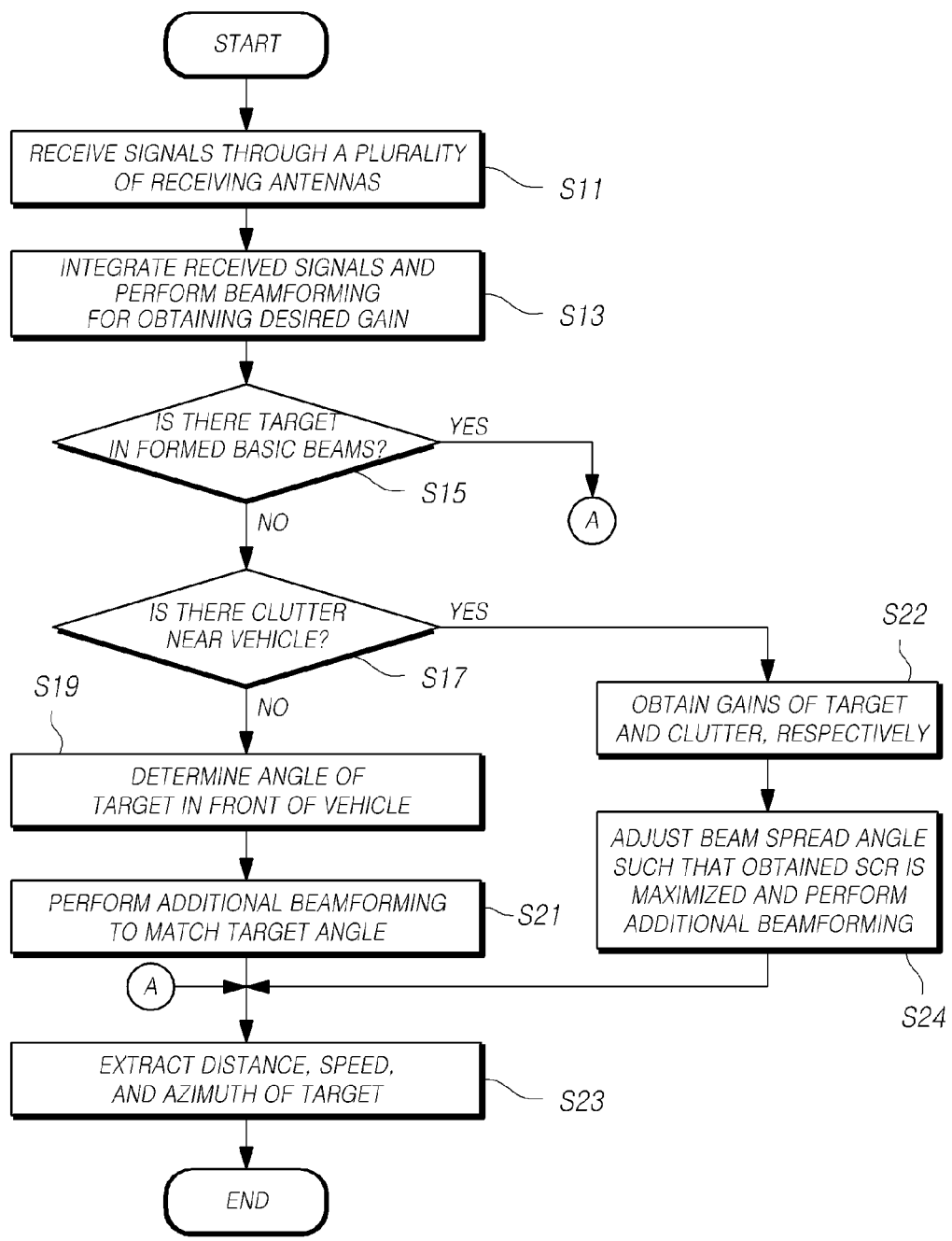
FIG. 4 is a flowchart illustrating a signal processing method of the radar signal processing apparatus, according to the present embodiment.

FIG. 4 is a flowchart illustrating a signal processing method of the radar signal processing apparatus, according to the present embodiment.

Referring to FIG. 4, the signal processing unit 30 receives, through a plurality of receiving antennas, signals that are reflected back among radar signals transmitted by the transmitting unit 10, respectively (S11).

The signal processing unit 30 integrates the received signals and performs the beamforming to obtain a desired gain (S13). At this time, three basic beams are formed at a predetermined angle by the performed beamforming.

The signal processing unit 30 determines whether or not there is a target in the basic formed beams (S15).

If there is a target in the basic formed beams as a result of the determination in operation S15, the signal processing unit 30 extracts the distance, speed, and azimuth of the target (S23).

If there is no target in the basic formed beams as a result of the determination in operation S15, the signal processing unit 30 determines whether or not there is a clutter near the vehicle (S17).

If there is no clutter near the vehicle as a result of the determination in operation S17, the signal processing unit 30 determines the angle of the target that is positioned in front of the vehicle (S19). At this time, the target angle may be determined based on the tracking information of the preceding target, or may be determined based on the travelling direction of the vehicle.

The signal processing unit 30 performs the additional beamforming to match the determined target angle (S21).

If there is a clutter near the vehicle as a result of the determination in operation S17, the signal processing unit 30 obtains the gains of the target and the clutter, respectively, and performs the additional beamforming by adjusting the beam spread angle such that the obtained gain ratio reaches a predetermined maximum reference ratio (S22).

As shown in the graph of FIG. 3, since the signal processing unit 30 has the angle information of the target and the clutter by using the track, the signal processing unit 30 may apply the angle information of the target and the clutter to the X-axis of the beamforming gain graph in order to thereby obtain each gain in consideration of the gain for each angle. When the beam spread angle of the beamforming changes, the gains for the target angle and the clutter angle also change. On the contrary, the beam spread angle of the beamforming may be obtained, in which such a ratio of the gains is maximized.

The signal processing unit 30 extracts the distance, angle, and azimuth of the target through the additional beamforming (S23).

Figure 5A:
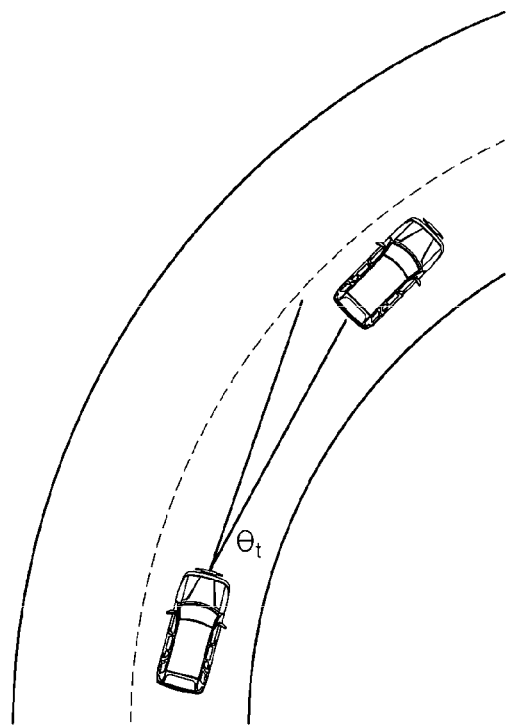
FIGS. 5(A) and 5(B) is an exemplary view to explain the environment for performing the additional beamforming to match the target angle.
Figure 5B:
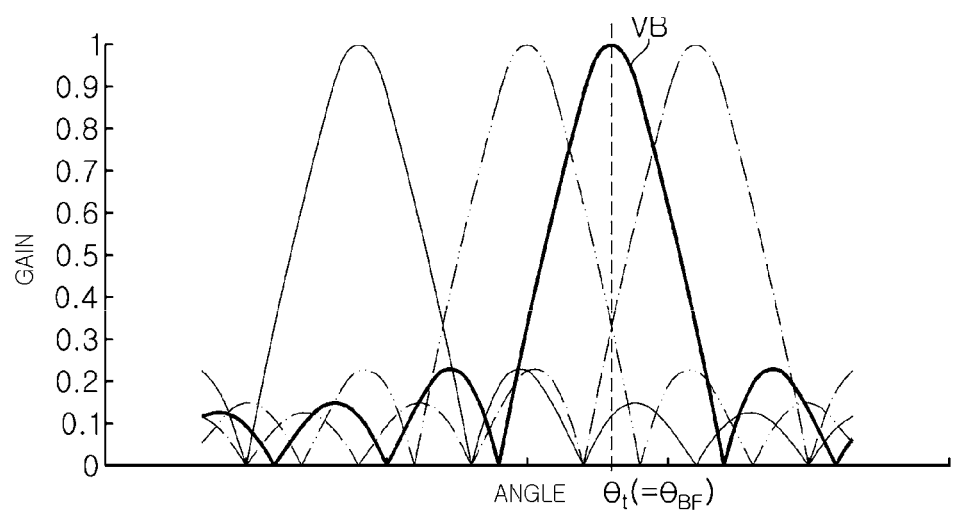

In the case where a vehicle follows a preceding vehicle on the curved road as shown in diagram of FIG. 5(A), even if the target exists within the vulnerable angle among three basic beams as shown in diagram of FIG. 5(B), the additional beamforming (VB) is performed to match the target angle θ, in order to thereby improve the detection performance of the target. At this time, the target angle matches the beam spread angle $\eta_{BF}$.

Figure 6A:
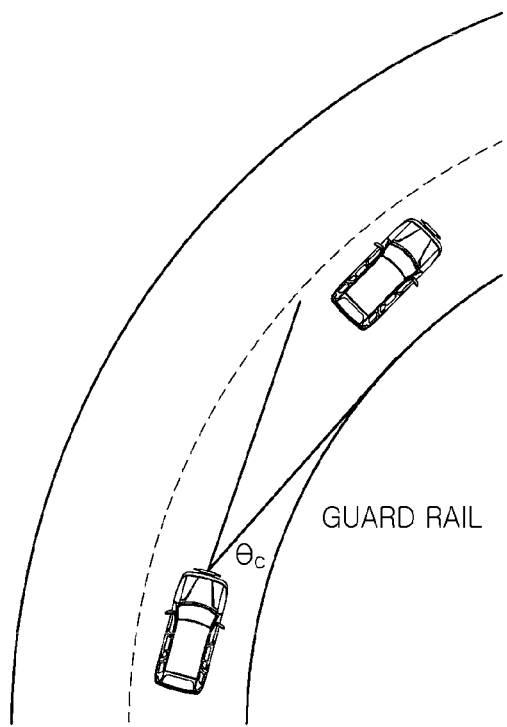
FIGS. 6(A) and 6(B) is an exemplary view to explain the environment for performing the additional beamforming by adjusting the beam spread angle.
Figure 6B:
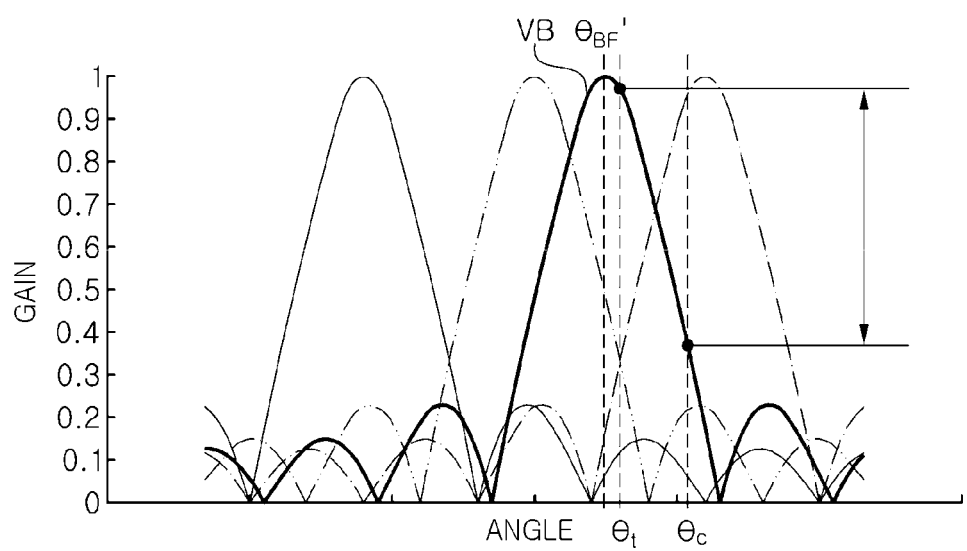

Furthermore, in the case where a vehicle follows a preceding vehicle on the curved road in the environment in which a guard rail exists near the vehicle as shown in diagram of FIG. 6(A), even if the target exists within a vulnerable angle among three basic beams, the additional beamforming (VB) is performed with a beam spread angle $\theta_{BF}'$ in which the ratio of the target to the clutter (SCR) is maximized, as shown in diagram of FIG. 6(B), in order to thereby improve the detection performance of the target. As another example, the beam spread angle $\theta_{BF}'$ according to the additional beamforming (VB) may be determined such that the difference between the gain of the target and the gain of the clutter is maximized.

Figure 7A:
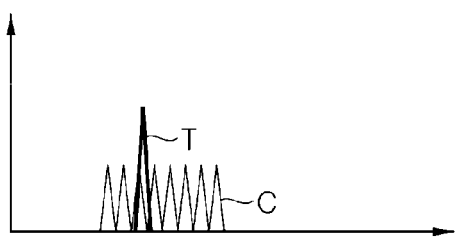
FIGS. 7(A) and 7(B) is a graph showing the target signal and the clutter signal in the case where the clutter exists near the vehicle.
Figure 7B:
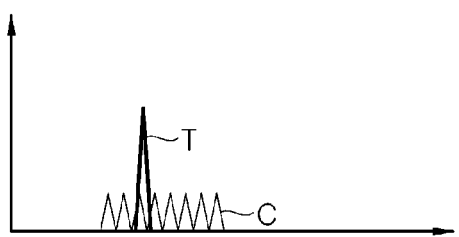

Diagram of FIG. 7(A) shows waveforms that are measured with respect to three basic beams in the travelling environment of diagram of FIG. 6(A), and diagram of FIG. 7(B) shows waveforms that are measured when performing the additional beamforming by adjusting the beam spread angle such that the gain ratio of the target and the clutter is maximized in addition to the three basic beams. As shown in the graph of diagram in FIG. 7(B), if there is a clutter near the vehicle, the beam spread angle is adjusted such that the SCR between the target signal (T) and the clutter signal (C) is maximized so that the target signal (T) and the clutter signal (C) can be clearly separated so that the target signal may be extracted, thereby easily extracting the distance, speed, and azimuth of the target.

The embodiments described above may be applied to the case where the vehicles travel on a curved road. That is, when the vehicles travel on a curved road, the additional beamforming described above may be performed.

The present invention is not limited to the embodiments above, and may be variously modified and changed by those skilled in the art without departing from the concept and scope of the present embodiments defined in the claims.

What is claimed is:

1. A radar signal processing apparatus comprising:
a transmitting unit configured to transmit radar signals forward from a vehicle;
a receiving unit configured to receive signals that are reflected back among the radar signals transmitted by the transmitting unit; and
a signal processing unit configured to extract a target in front of the vehicle based on the signals received by the receiving unit,
wherein the receiving unit receives the received signals that are reflected back among the radar signals by using an antenna array including a plurality of receiving antennas,
the signal processing unit integrates the signals received by the plurality of receiving antennas, forms a basic beam at a predetermined angle, and, when the target is not detected in the basic beam formed at the predetermined angle, determines target angle information based on a travelling direction of the vehicle and/or track information of the target and performs two or more beamformings, which have different beam spread angles, wherein the beamformings are performed such that one or more beam spread angles are determined based on the target angle information determined based on the travelling directions of the vehicle and/or the track information of the target.

2. The apparatus according to claim 1, wherein the one or more beam spread angles are determined such that a gain of the received signal is maximized in a target angle.

3. The apparatus according to claim 1, wherein the signal processing unit is configured to, when there is a clutter structure that generates a clutter signal, determine the one or more beam spread angles by using clutter angle information between travelling directions of the vehicle and the clutter structure.

4. The apparatus according to claim 3, wherein the signal processing unit determines the one or more beam spread angles such that difference between a target gain by the target and a clutter gain by the clutter structure is maximized.

5. The apparatus according to claim 3, wherein the signal processing unit determines the one or more beam spread angles such that a ratio of a target gain by the target to a clutter gain by the clutter structure is minimized.

6. The apparatus according to claim 3, wherein the signal processing unit determines the one or more beam spread angles such that a ratio of a clutter gain by the clutter structure to a target gain by the target is maximized.

7. The apparatus according to claim 1, wherein the signal processing unit determines the one or more beam spread angles and performs the beamforming when the vehicle travels on a curved road.

8. A signal processing method of a radar signal processing apparatus including: a transmitting unit configured to transmit radar signals forward from a vehicle; a receiving unit configured to receive signals that are reflected back among the radar signals transmitted by the transmitting unit; and a signal processing unit configured to extract a target in front of the vehicle based on the signals received by the receiving unit, the method comprising:

forming a basic beam at a predetermined angle;

when the target is not detected in the basic beam formed at the predetermined angle, determining, by the signal processing unit, target angle information based on a travelling direction of the vehicle and/or track information of the target, and determining, by the signal processing unit, one or more beam spread angles based on the target angle information determined based on the travelling direction of the vehicle and/or the track information of the target; and integrating, by the signal processing unit, the signals received by the plurality of receiving antennas contained in the receiving unit based on the one or more beam spread angles and/or the predetermined angle, respectively, to perform two or more beamformings.

9. The method according to claim 8, wherein the one or more beam spread angles are determined such that a gain of the received signal is maximized in a target angle.

10. The method according to claim 8, wherein, if there is a clutter structure that generates a clutter signal, the one or more beam spread angles are determined by using clutter angle information between a travelling direction of the vehicle and the clutter structure.

11. The method according to claim 10, wherein the one or more beam spread angles are determined such that difference between a target gain by the target and a clutter gain by the clutter structure is maximized.

12. The apparatus according to claim 1, wherein the track information results from a previous cycle of processing of the signals.

13. The method according to claim 8, wherein the track information results from a previous cycle of processing of the signals.

* * * * *